United States Patent Office 3,532,740
Patented Oct. 6, 1970

3,532,740
OXIDATIVE DEHYDROGENATION PROCESS
Charles W. Hargis, Johnson City, and Howard S. Young, Kingsport, Tenn., assignors to Eastman Kodak Company, Rochester, N.Y., a corporation of New Jersey
No Drawing. Continuation-in-part of application Ser. No. 152,630, Nov. 15, 1961. This application May 18, 1966, Ser. No. 550,931
Int. Cl. C07c *45/12*
U.S. Cl. 260—486
24 Claims This application is a continuation-in-part of our copending application Ser. No. 152,630, filed Nov. 15, 1961, now abandoned, which was copending with and a continuation-in-part of our application Ser. No. 10,107, filed Feb. 23, 1960, now abandoned.

This invention relates to selective oxidation of unsaturated aliphatic hydrocarbon derivatives. More particularly the invention relates to selective oxidation of an alkyl derivative having a functional group in which functional unsaturation occurs, to produce a corresponding olefinic derivative.

The principal object of the invention is to provide a method for selective oxidation of a compound consisting of a lower alkyl radical attached to a functional group in which functional unsaturation occurs, and by such oxidation to produce the corresponding alpha-beta unsaturated compound. Another object of the invention is to provide a method for reacting an aliphatic derivative with an oxide of antimony, arsenic bismuth to produce such alpha-beta unsaturated olefinic derivatives.

The invention provides a method for selective oxidation at the alpha and beta carbon atoms of the alkyl radical in compounds consisting of a lower alkyl radical attached to a functional group in which functional unsaturation occurs between the first carbon atom and an adjacent atom.

By "functional unsaturation" as the term is used in this specification we mean an unsaturated linkage, either a double bond or a triple bond, between two atoms of a functional group (between the first carbon atom and an adjacent atom of the functional group in the instance of the invention). To illustrate, in the functional group of ketone $$R-\overset{O}{\underset{\|}{C}}-R$$

functional unsaturation as we use the term occurs at the double bond between C and O.

Functional unsaturation occurs between the first carbon atom and an adjacent atom in the following functional groups for instance:

$-\overset{O}{\underset{\|}{C}}-OH$     acid $-\overset{O}{\underset{\|}{C}}-OR$     ester $-\overset{O}{\underset{\|}{C}}-H$     aldehyde $-\overset{O}{\underset{\|}{C}}-R$     ketone $-C_3H=CH_2$     vinylene

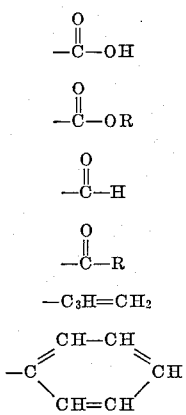
phenyl

Thus, alkyl derivatives such as

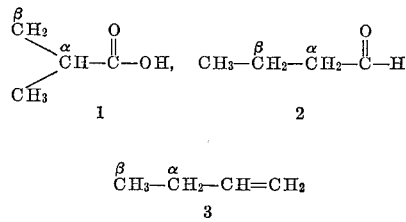

and $$\overset{\beta}{C}H_3-\overset{\alpha}{C}H_2-CH=CH_2$$
3 are oxidized to the corresponding alpha,beta-unsaturated derivatives

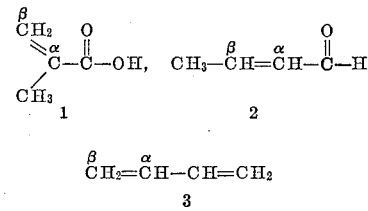

and $$\overset{\beta}{C}H_2=\overset{\alpha}{C}H-CH=CH_2$$
3

We have found that selective oxidation of the alpha, beta-carbon atoms of the alkyl radical is accomplished by action of an oxidizing agent consisting of one of, or a mixture of, the oxides of arsenic, antimony, and bismuth. When contacted with the "functionally unsaturated" organic compound at elevated temperatures, the metal oxide is reduced and yields oxygen which combines with hydrogen from the alpha and beta carbon atoms of the oxidized compound. An alpha,beta-unsaturated compound is produced.

Therefore, according to the invention, vapor of a compound having the formula:

$$R^1-\underset{\underset{R^2}{|}}{C}H-\underset{\underset{R^3}{|}}{C}H-X$$

wherein X is a functional group in which functional unsaturation occurs between the first carbon atom and an adjacent atom, is contacted at a temperature above 100° C. with at least one member selected from the group consisting of oxides of arsenic, antimony, and bismuth.

In the foregoing formulae for the functionally unsaturated compounds useful in the process of our invention the substituent X is typically of the formula:

(a)     $-\overset{O}{\underset{\|}{C}}R^4$ (b)     $-CH=CH-$ or (c)     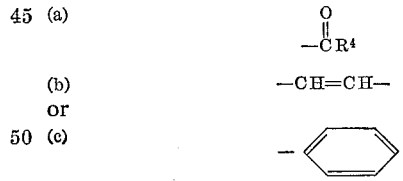

in which $R^4$, when taken singly, is typically hydrogen, alkyl, hydroxy, or alkoxy. The substituents $R^1$, $R^2$, and $R^3$, when taken singly are hydrogen or alkyl. The substituents $R^1$ and $R^3$, when taken collectively, represent joined alkylene groups completing a saturated carbocyclic ring having 5 to 6, preferably 6, carbon atoms in the ring; and the substituents $R^1$ and $R^4$, when taken collectively, represent joined alkylene groups completing a saturated carbocyclic ring having 5 to 6, preferably 6, carbon atoms in the ring.

The substituents $R^1$, $R^2$, $R^3$ and $R^4$, when alkyl, are typically alkyl of 1 to about 8 carbon atoms and are preferably lower alkyl, e.g., alkyl of 1 to about 4 carbon atoms. When $R^4$ is alkoxy, it typically contains an alkyl moiety of 1 to about 8 carbon atoms. The alkyl moiety of the alkoxy group represented by $R^4$ is preferably lower alkyl, e.g., alkyl of 1 to about 4 carbon atoms.

Typical of the alkyl groups represented by $R^1$, $R^2$, $R^3$, and $R^4$ are methyl, ethyl, propyl, isopropyl, butyl, isobutyl, sec-butyl, tert-butyl, etc. The substituent $R^4$, when alkoxy, is typically methoxy, ethoxy, propoxy, isopropoxy butoxy, isobutoxy, sec-butoxy, tert-butoxy, etc.

When $R^1$ and $R^3$ collectively represent joined alkylene groups completing a carbocyclic ring, the carbocyclic rings so represented are typically cyclopentyl or cyclohexyl. When $R^1$ and $R^4$ collectively represent joined alkylene groups completing a carbocyclic ring, the carbocyclic rings so represented are typically cyclopentyl or cyclohexyl.

The alpha,beta-unsaturated compounds formed in the process of our invention can be represented by the formula:

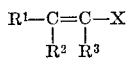

in which $R^1$, $R^2$, $R^3$ and X are as defined hereinbefore, when the functionally unsaturated compound employed has only one alpha-beta position capable of being oxidatively dehydrogenated.

When the functionally unsaturated compound has two or more alpha-beta positions capable of being oxidatively dehydrogenated, dehydrogenation can occur at both positions. Thus, diethyl ketone can react with antimony tetroxide to form divinyl ketone. In a particularly interesting embodiment of this aspect of our invention, cyclohexanone reacts with an inorganic oxide apparently to form 2,5-cyclohexadiene-1-one or 2,4-cyclohexadiene-1-one which immediately rearranges to phenol.

Typical of the functionally unsaturated compounds which are useful in the process of our invention are compounds such as propionaldehyde, methyl ethyl ketone, propionic acid, methyl propionate, cyclohexanone, ethylbenzene, 1-butene, cyclohexanecarboxaldehyde, methyl cyclohexanecarboxylate, cyclohexanecarboxylic acid, cyclohexyl benzene, etc.

The process of our invention involves a reaction between the functionally unsaturated compound and the selected metal oxide or oxy-acid thereof. For example, isobutyraldehyde, reacts with arsenic pentoxide to form methacrolein, water, and a reduced form of the arsenic pentoxide, e.g., arsenic trioxide or elemental arsenic.

The mechanics of the process consist simply of contacting the organic compound to be oxidized with a metal oxide in a reaction zone at a temperature between 100° C. and 600° C., preferably between 150° C. and 500° C. This is conveniently done by passing a stream of vapor of the organic compound through a reaction vessel packed with particles of the selected metal oxide. Fine particles of the metal oxide are preferred because more surface area per unit of volume will be available for contact with the organic vapor. In some cases it may be advantageous to dilute the vapor stream with nitrogen or other inert gas to control the temperature in the reaction zone, to reduce the rate of side-reactions, and to facilitate removal of reaction products from the reaction zone. The optimum ratio of the volume of diluent gas per volume of organic vapor will depend upon the reactants being used and the reaction temperature and contact time but will usually be within the range from 0 to 2.0 volumes inert gas per volume of organic vapor. The process is operable within wide ranges of temperature, pressure and contact time. However, because of sensitivity of organic compounds to changes in temperature under oxidative conditions, consideration must be given to the relation of operating variables. For instance, the permissible range of contact time will be different at various temperatures within the preferred temperature range. With increase in temperature, the contact time must be decreased commensurately to avoid excessive consumption of organic feed stock in side-reactions. The optimum contact time will be a function of the organic and metal oxide reactants chosen and of the reaction temperature but will usually fall within the range from about 0.1 to about 75 seconds. The term "contact time" as used in this specification is defined as the ratio of bulk contact mass volume (for instance in cubic feet) to reactant vapor feed rate (for instance in cubic feet per second). This is to be distinguished from exposure time for the metal oxide which is the total time a sample of solid metal oxide is exposed to reactants in the reaction zone.

To the extent found necessary, temperature in the reaction zone may be regulated by controlling feed temperature and, when a diluent is used, by controlling the ratio of diluent to reactant in the feed stream. The reaction proceeds at a temperature above about 100° C. and reactions conducted at temperatures between about 325° C. and 475° C. give good product yields. Good yields are obtained at atmospheric pressure which is preferred for economic reasons, but the pressure in the reaction zone may be varied.

The oxide or mixture of oxides selected for a particular reaction and the valence state of the oxide or mixture of oxides must be considered as factors having marked influence on the choice of operating conditions. An oxide in which the metallic element is present in a higher valence state, a valence of 5 for example, is more vigorous in oxidative action than one in a lower valence state. Less severe operating conditions such as lower reaction temperature and decreased contact time can therefore be employed when an oxide of the higher valence state is used. Also, oxidation activity of the metal oxides in a given valence state tends to increase as oxides of metal in descending order in the periodic series are selected. For example, arsenic pentoxide requires higher operating temperatures and/or more prolonged contact times for a comparable production of unsaturates than does antimony pentoxide. The flexibility in operating conditions made possible by varying degrees of oxidation activity of the oxides or mixtures thereof can be of considerable importance in selection of a suitable oxide and suitable operating conditions, since the heat stability and reaction stability of the various organic compounds which may be oxidized will differ.

Some of the organic compounds which may be oxidized according to the invention possess sufficient stability to allow feeding of some air into the reaction zone with the organic compound. The advantage of introducing air with the feed stream is that the exposure time for the oxidizing agent is extended because some of the reduced metal oxide in the reaction zone is reoxidized by the air introduced with the feed stream. But in some cases presence of air will cause excessive side reactions which will reduce the product yield substantially. Ethylbenzene is an example of a compound with which air may be introduced in carefully controlled amounts. The optimum volume of air to be used will depend upon the particular reactants selected as well as the operating conditions. Usually the optimum will be in the range from 0 to 0.8 volumes of air per volume of organic vapor.

The following examples are given to illustrate the invention.

EXAMPLE 1

Over a period of two hours, 0.373 mole of isobutyraldehyde was passed over granular antimony pentoxide contained in a 1-inch diameter Vycor tube 33 inches long, at a temperature of 325° C. and a contact time of 15.5 seconds. The reaction product, which was composed of an aqueous phase and an organic phase, was collected in traps, cooled to 10° C. and −80° C. The organic reaction product amounted to 97.5 percent of the weight of the liquid feed which had been metered to the reactor during the run. Analysis of the product showed 0.075 mole of methacrolein and 0.281 mole of unreacted isobutyraldehyde. The conversion of isobutyraldehyde feed to methacrolein was 20.1 percent and the yield of methacrolein based on isobutyraldehyde consumed was 81.5 percent. The organic product contained traces of biacetyl.

Vycor is a trademark for heat- and chemical-resistant glassware of various compositions and physical properties, all characterized by extremely low coefficients of expansion.

EXAMPLE 2

Over a period of one hour, a mixture consisting of 0.20 mole of isobutyraldehyde and 0.20 mole of nitrogen was passed over granular antimony tetroxide at 450° C. and a contact time of 7.4 seconds. The tetroxide had been prepared by heating a sample of antimony pentoxide in air at 780° C. The two-phase liquid reaction product was collected as in Example I. The organic phase amounted to 92 percent of the liquid fed during the run. Analysis of the organic product showed 0.084 mole of methacrolein and 0.10 mole of unreacted isobutyraldehyde, corresponding to a conversion to methacrolein of 42.0 percent and a yield of 84.0 percent.

The same sample of oxidant was then used for a second 1-hour period of operation under the same conditions without regenerative treatment of the oxidant. Analysis of the organic liquid product obtained indicated a conversion of 20.3 percent and a yield of 86.4 percent. Thus during the second 1-hour period of oxidant use, the methacrolein production rate was only about half of that obtained on initial use.

The used oxidant was regenerated by treating with a mixture of nitrogen and air at a furnace temperature of 450° C. The concentration of oxygen in the regenerating mixture was adjusted to maintain a temperature in the hottest point in the oxidant bed below 545° C. Heating in the nitrogen-air mixture was continued until no further heat of reaction could be detected. The regenerated oxidant was then used for a 1-hour period at the initial testing conditions. The conversion and yield of methacrolein as determined by product analysis were 41.5 percent and 82.4 percent respectively. Thus the initial activity of the oxidant bed had been restored by the regenerative treatment.

Using the apparatus and procedural methods of Examples I and II, a number of lower aliphatic derivatives were reacted with oxides of arsenic, antimony, and bismuth to produce the corresponding alpha-beta unsaturated derivative. Data and results of these reactions are tabulated in Table I.

The particular solid oxidant selected for use may be obtained in various ways such as by oxidation of the free metal or a mixture of free metals taken alone or in any desired proportions, by known chemical methods. Or, intermediate or lower oxides or their mixtures may be formed by thermal decomposition and/or chemical reduction of higher oxides or suitable mixtures thereof. Methods for affecting these various transpositions are a matter of record and may be found by reference to the usual sources such as textbooks or inorganic chemistry. In the same manner, samples of oxidant that have lost dehydrogenating activity due to conversion to a lower oxide or other inactive species can be regenerated by suitable chemical treatment to form the starting oxidant. In this respect antimony tetroxide has proven to be a particularly useful form of oxidant since the spent oxidant can be readily regenerated by heating in air as in Example 2.

Although we have not made an extensive study of the reduction product of the metal oxides we know the action of the oxides is that of an oxidizing agent rather than that of a catalyst. This is clearly indicated by presence of water in the reaction product as well as by visible evidence of lower oxides, and in some cases metals, in the spent solid materials. For example prolonged exposure of bismuth trioxide with the organic reducing medium resulted in the formation of the metal, along with water and the ethylenically unsaturated compound. To prevent this occurrence with subsequent loss of metal from the reaction zone, we prefer to treat the oxidant before excessive reduction has occurred, with air in a separate operation. When the operation is carried out in this manner no visible signs of metal in the spent solids are seen following partial reduction of the oxidant. Possibly a lower oxide was formed or microscopic particles of metal in readily oxidizable form were dispersed in the solid.

The oxides selected for use in the process of the invention may be used in the form of solid particles of the oxide or may be suspended on a carrier such as silica gel, alumina or silica by conventional procedures. Small particles of the selected oxide can conveniently be used in a conventional circulating-fluidized-bed reactor with the advantage that fresh oxides may be continuously introduced into the reaction zone as spent solids are removed for regeneration.

TABLE I

| Ex. No. | Alkyl derivatives | Oxidizing agent | Reaction zone temp. | Contact time, sec. | Product | Conversion, percent | Yield, percent | Remarks |
|---|---|---|---|---|---|---|---|---|
| 3 | Isobutyraldehyde | $Sb_2O_4$ | 450 | 7.4 | Methacrolein | 45.5 | 79.2 | Equimolar quantity of $N_2$ fed with the aldehyde feed. |
| 4 | Isobutyraldehyde | $Bi_2O_3$ | 450 | 7.4 | Methacrolein | 41.3 | 68.9 | Equimolar quantity of $N_2$ fed with the aldehyde feed. |
| 5 | do | $As_2O_5$ | 350 | 13.6 | Methacrolein | 31.4 | 85.5 | Some sublimed $As_2O_3$ carried over with product; equimolar quantity of $N_2$ fed with organic feed. |
| 6 | n-Butyraldehyde | $Sb_2O_4$ | 480 | 6.6 | Crotonaldehyde | 20.0 | 73.5 | Equimolar quantity of $N_2$ fed with organic feed. |
| 7 | Isobutyric acid | $As_2O_5$ | 450 | 23 | Methacrylic acid | 10.5 | 35.5 | |
| 8 | n-Butyric acid | $As_2O_5$ | 450 | 23 | Crotonic acid | 8.5 | 42.3 | |
| 9 | Methyl isobutyrate | $As_2O_5$ | 450 | 12.5 | Methyl methacrylate | 10.3 | 49.5 | |
| 10 | Propionaldehyde | $Sb_2O_4$ | 475 | 6.8 | Acrolein | 5.2 | 61.8 | |
| 11 | Ethylbenzene | $Sb_2O_4$ | 505 | 5.9 | Styrene | 19.1 | 73.2 | 0.33 mole air and 0.33 mole $N_2$ fed with 0.48 mole of organic feed. |
| 12 | Methyl ethyl ketone | $Sb_2O_4$ | 455 | 10.4 | Methyl vinyl ketone | 33.1 | | Yield not determined. Methyl vinyl ketone identified by gas chromatography. |
| 13 | Diethyl ketone | $Sb_2O_4$ | 455 | 11.2 | Ethyl vinyl ketone | 51.2 | | Yield not determined. Ethyl vinyl ketone identified by infrared. |
| 14 | Butene-1 | $Bi_2O_3$ | 500 | 11.8 | Butadiene | 4.7 | | Yield not determined. Butadiene identified by gas chromatography. |

Alkyl derivatives having functional groups without functional unsaturation were substituted in the process and although oxidation occurred there was a marked lack of specificity of reaction. A number of useful oxidation products were produced. Isobutyl alcohol was oxidized to a mixture including substantial amounts of isobutyraldehyde, methacrolein, methallyl alcohol, as well as some other products not identified. Similarly, arrays of oxidation products were obtained from n-propyl alcohol and ethyl chloride.

Salts of the oxy-acids or arsenic, bismuth, and antimony appear to be equivalent in oxidizing effect to the oxides from which the salts have been derived. Calcium arsenate when used as the oxidizing agent appears to be reduced in the process to calcium oxide and arsenic trioxide. In experiments in which calcium arsenate from ortho-arsenate was used, arsenic trioxide was found sublimed on condenser surfaces outside the reaction chamber, indicating a reduction of arsenic valence from 5 to 3 as when arsenic pentoxide was used. The following example illustrates a preferred embodiment of the invention in which an oxy-acid of antimony is the oxidizing agent.

EXAMPLE 15

During a period of 7 hours and 15 minutes, a sample of granular potassium pyroantimonate, $K_4Sb_2O_7$ having a volume of 85 ml. and heated to a temperature of 455° C. in the Vycor tube of Example 1 was contacted with 90.3 g. of isobutyraldehyde. Methacrolein was produced throughout the entire period of operation as shown by chromatographic examination of product samples taken periodically throughout the run and by the continuous production or organic-aqueous reaction effluent. The organic product weighed 85.8 g. and contained 30 g. of methacrolein.

Sufides of arsenic, antimony, and bismuth can be used instead of the oxides of oxy-acid salts as the oxidizing agent in the process, though we prefer to use oxides or salts of oxy-acids of those metals.

In all of the above examples only one alpha-beta position could be oxidized to form a double bond. With compounds in which oxidation to form a double bond can occur at two alpha-beta positions, both positions may be oxidized by the process of this invention. Some examples of such compounds are dialkylketones such as diethylketone, dialkylthioketones, dialkylvinyl compounds and dialkyl benzenes. These are oxidized by the process of the invention to the corresponding dialkenyl derivatives. The reaction product may contain some or both the singly and the doubly oxidized derivatives.

EXAMPLE 16

During a period of 30 minutes, 13.8 g. of diisobutyl ketone was passed over a sample of 4 x 20 mesh arsenic pentoxide having an initial volume of 50 ml. and heated to a temperature of 450° C. in the Vycor tube of Example 1. Phorone and isophorone were identified in the organic phase of the two-phase liquid product. The formation of phorone further demonstrates the principle of extended dehydrogenation where more than one alpha-beta position is available for reaction. Isophorone would be expected from a Michael's reaction involving conjugate addition of an active methylene component to an alpha,beta-unsaturated compound.

In cyclohexanone an interesting double alpha-beta oxidation occurs to form an unstable alpha-beta diene derivative that rearranges to phenol.

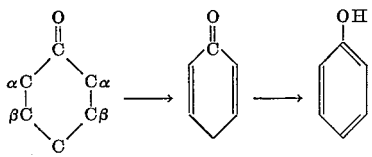

EXAMPLE 17

During a period of 30 minutes, a sample of 4 x 20 mesh arsenic pentoxide having an initial volume of 50 ml. and heated to a temperature of 445° C. in the Vycor tube of Example 1 was contacted with 6.2 g. of gaseous cyclohexanone and 300 ml. of nitrogen. From the two-phase liquid product was isolated 1.2 g. of phenol in addition to unreacted cyclohexanone. Arsenic trioxide and water were also products of the reaction.

Though the invention has been described with reference to certain preferred embodiments, it will be understood that variations and modifications can be made within the scope of the invention as defined in the following claims.

We claim:

1. The process which comprises reacting at least one compound from the group of oxides or oxy-acids salts of arsenic, antimony, or bismuth in the absence of activated alumino with a functionally unsaturated compound of the formula:

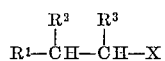

in which X is a functionally unsaturated group selected from those of the formula:

(a) 

(b) $-CH=CH_2$ or (c) 

each of $R^1$, $R^2$ and $R^3$ when taken singly, is selected from:

(a) hydrogen or (b) alkyl;

$R^4$, when taken singly, is selected from (a) hydrogen (b) alkyl (c) hydroxy or (d) alkoxy;

$R^1$ and $R^3$, when taken collectively, represent joined alkylene groups completing a saturated carboxycyclic ring having 4 to 6 carbon atoms in the ring; and $R^1$ and $R^4$, when taken collectively, represent joined alkylene groups completing a saturated carbocyclic ring having 4 to 6 carbon atoms in the ring.

2. The process of claim 1 in which the reaction is carried out by contacting the oxide or oxy-acid salt of arsenic, antimony, or bismuth with the functionally unsaturated compound for about 0.1 to about 75 seconds at a temperature above 100° C.

3. The process of claim 2 in which the functionally unsaturated compound is isobutyraldehyde and the products of the reaction include methacrolein and water.

4. The process of claim 2 in which the functionally unsaturated compound is n-butyraldehyde and the products of the reaction include crotonaldehyde and water.

5. The process of claim 2 in which the functionally unsaturated compound is isobutyric acid and the products of the reaction include methacrylic acid and water.

6. The process of claim 2 in which the functionally unsaturated compound is n-butyric acid and the products of the reaction includes crotonic acid and water.

7. The process of claim 2 in which the functionally unsaturated compound is methyl isobutyrate and the products of the reaction include methyl methacrylate and water.

8. The process of claim 2 in which the functionally unsaturated compound is propionaldehyde and the products of the reaction include acrolein and water.

9. The process of claim 2 in which the functionally unsaturated compound is ethylbenzene and the products of the reaction include styrene and water.

10. The process of claim 2 in which the functionally unsaturated compound is cyclohexanone and the products of the reaction include phenol and water.

11. A process for the production of an alkenyl benzene which comprises reacting an alkyl benzene in which the alkyl side chains contain separately at least two carbon atoms at an elevated temperature in the vapor phase, with a gas consisting essentially of molecular oxygen or molecular oxygen in combination with an inert diluent over an oxidation catalyst selected from the group consisting of (i) antimony oxide alone and (ii) in combination with an oxide of a polyvalent metal selected from arsenic and bismuth, whilst maintaining the conditions of reaction such that oxidation of the starting material to acidic reaction products is substantially avoided.

12. A process as claimed in claim 11 wherein the polyvalent metal is bismuth.

13. A process as claimed in claim 11 wherein the catalyst is heated in a molecular oxygen containing gas to a temperature of 780° C. before use.

14. A process as claimed in claim 11 wherein the catalyst is deposited on a support material.

15. A process as claimed in claim 14 wherein the support material is selected from the group consisting of silica and alumina.

16. A process as claimed in claim 14 wherein the support material is heated before deposition of the catalyst.

17. A process as claimed in claim 11 wherein the alkyl benzene is ethyl benzene.

18. A process as claimed in claim 11 wherein the proportions of alkyl benzene in the feed is in the range about 26% to about 30% by volume.

19. A process as claimed in claim 11 wherein the concentration of oxygen in the reaction mixture is in the range 5 to 9% by volume.

20. A process as claimed in claim 11 wherein the feed contains a gaseous diluent which is inert under the conditions of the reaction.

21. A process as claimed in claim 20 wherein the gaseous diluent is nitrogen.

22. A process as claimed in claim 11 carried out at temperatures in the range 200 to 600° C.

23. A process as claimed in claim 22 carried out at temperatures in the range 375 to 500° C.

24. A process as claimed in claim 11 carried out with a contact time within the range 0.5 to 30 seconds.

References Cited

UNITED STATES PATENTS

| | | | |
|---|---|---|---|
| 1,636,952 | 7/1927 | Craver | 260—603 |
| 2,101,820 | 12/1937 | Woodhouse | 260—603 |
| 2,378,209 | 6/1945 | Fuller et al. | 260—673.5 |
| 2,945,057 | 7/1960 | McDaniel | 260—486 |

PAUL M. COUGHLAN, JR., Primary Examiner

C. R. DAVIS, Assistant Examiner

U.S. Cl. X.R.

260—396, 405.5, 468, 514, 526, 586, 598, 601, 621, 669, 680